Jan. 14, 1941.   N. MILLER   2,228,282
SELF-SECURING TAPERED MOUNT
Filed Oct. 24, 1938    4 Sheets-Sheet 1
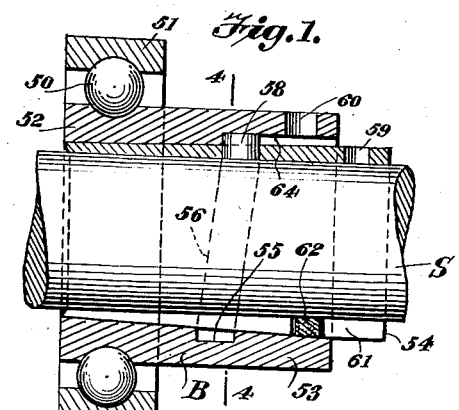
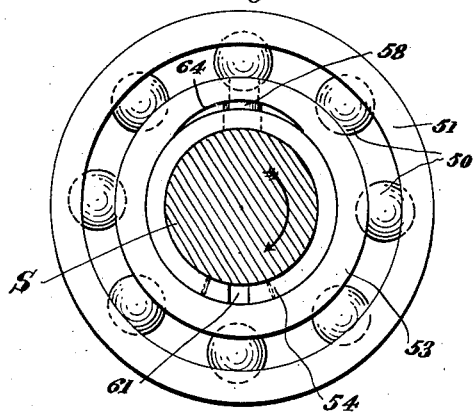
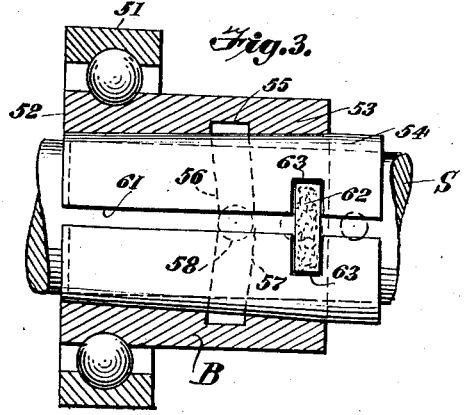
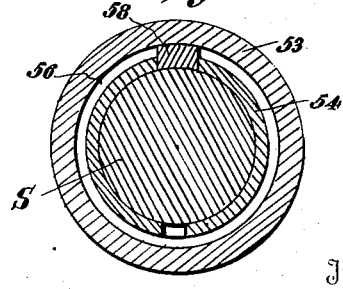
Inventor
NILS MILLER Jan. 14, 1941.  N. MILLER  2,228,282
SELF-SECURING TAPERED MOUNT
Filed Oct. 24, 1938  4 Sheets-Sheet 2
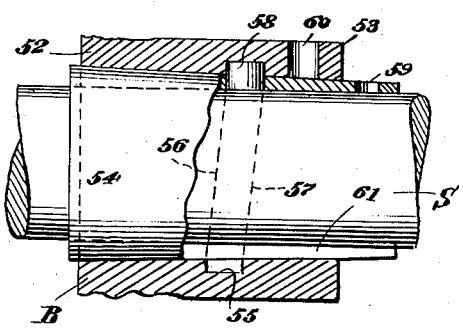
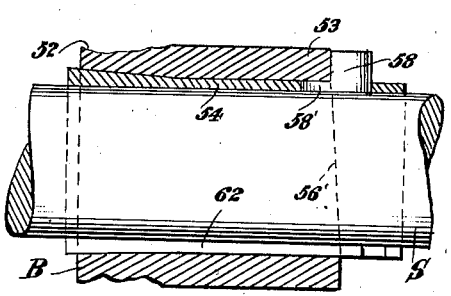
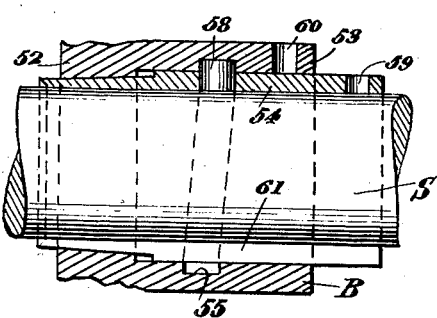
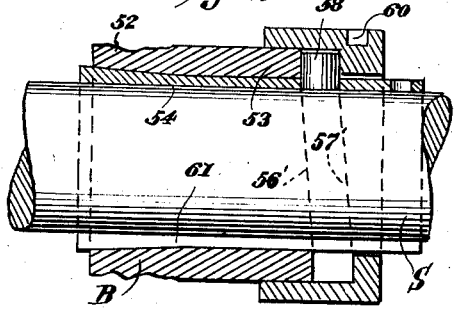
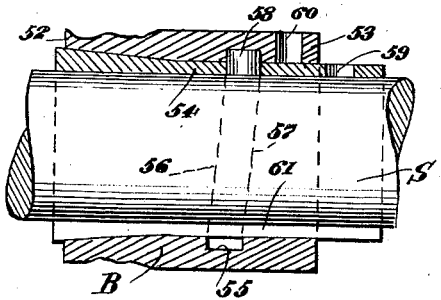
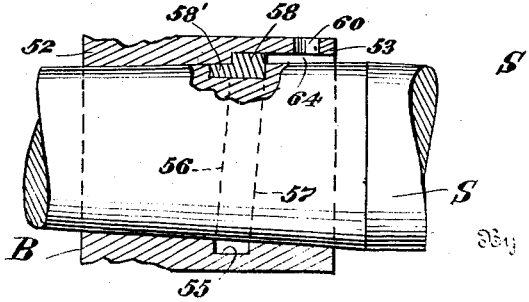
Inventor
NILS MILLER

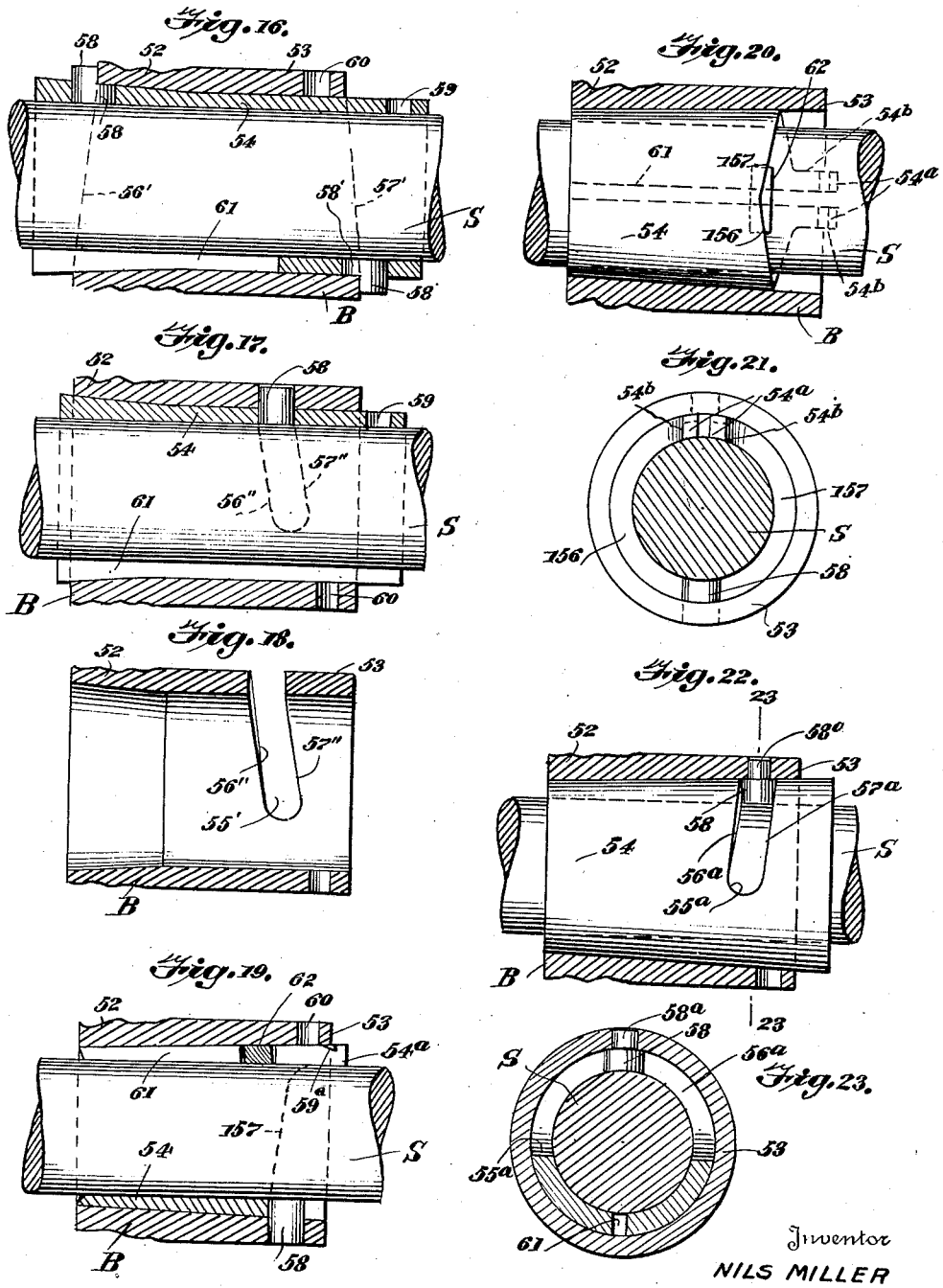

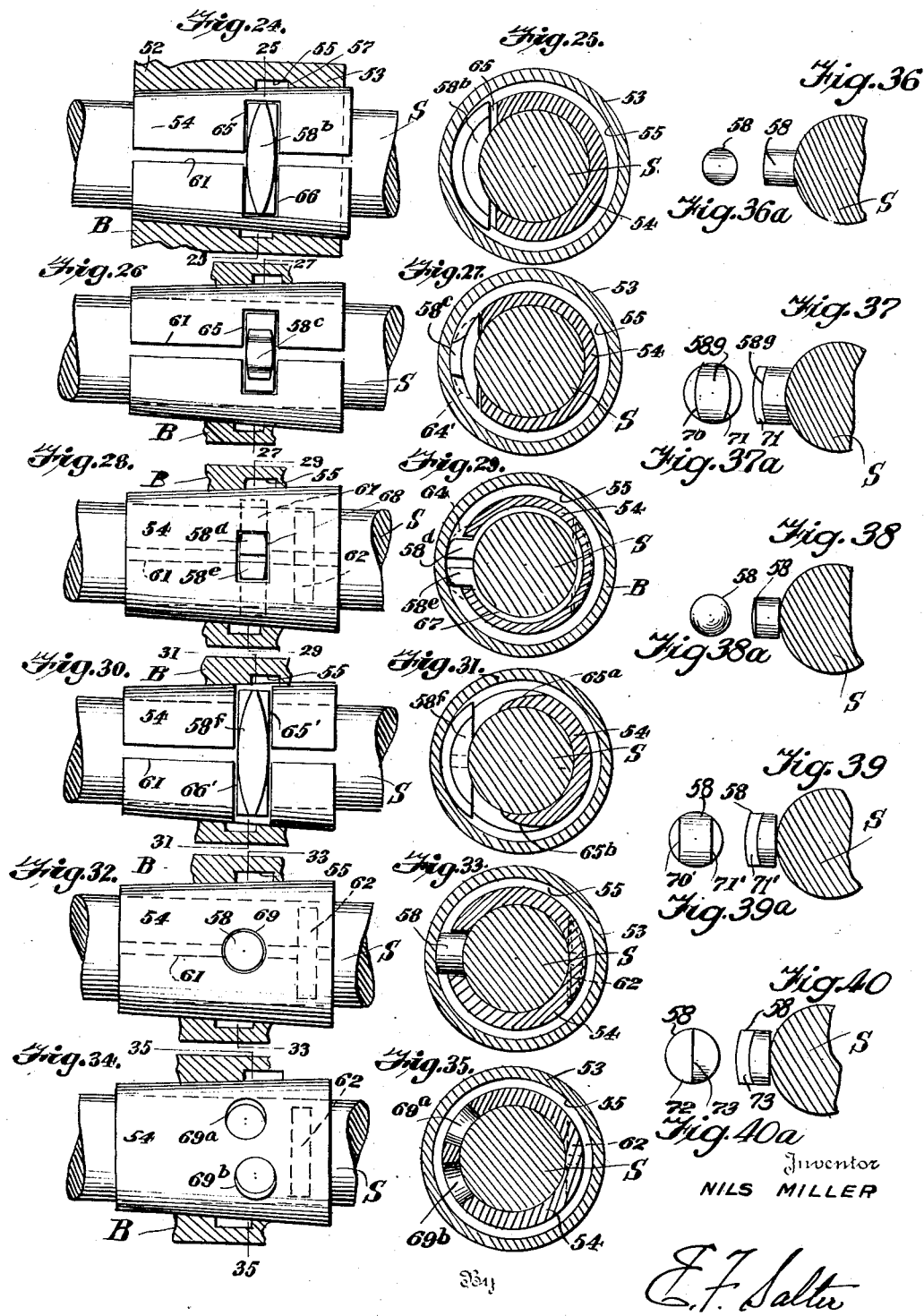

Patented Jan. 14, 1941

2,228,282

UNITED STATES PATENT OFFICE 2,228,282

SELF-SECURING TAPERED MOUNT

Nils Miller, Atlanta, Ga.

Application October 24, 1938, Serial No. 236,774

14 Claims. (Cl. 287—52.09)

This invention relates to mountings for machine parts and has particular reference to shaft and bearing assemblies in which the members are to be locked against relative axial and rotative shifting with respect to a set adjustment in service.

The generally accepted prior practice, especially in the mounting of anti-friction bearings of the roller or ball type, has been to mount the taper bore inner bearing race directly onto and over an axial support, such as an arbor, of corresponding taper, or to mount the taper bore race on and over an intermediate tubular split adapter having an outer surface of corresponding taper and with a cylindrical bore, when used with a cylindrical support, and to draw up or tighten the assembly by means of threaded nuts, plates, cap screws, washers and the like, having threaded engagement with either the bearing race or support, or adapter.

The present invention is designed to provide a self-securing mounting for bearings and the like, in which the use of nuts, lock washers, end plates, cap screws, and threading of adapters or shafts is entirely dispensed with, thus materially reducing the number of parts and the cost of manufacture.

The invention has also for an object the provision of a machine part mount for arbors in which the assembly is automatically self-securing in either direction of rotation of the arbor, or of machine part associated with the outer race of a bearing.

Another object is to provide an anti-friction bearing mount for shafts, axles and the like, in which the tractive force resulting from the reverse rotation of the balls or rollers on their individual axes as compared to the direction of rotation of the supported part of the assembly, is utilized to effect a self-tightening of the mount on and with respect to its associated shaft or axle.

A further object is to provide a self-securing bearing mount having the above stated characteristics, which will remain firmly and positively secured to its support irrespective of prevailing support vibrations, and one which can be installed or dismounted by an inexperienced man.

The invention comprehends numerous other objects which will become apparent as the description proceeds.

It is to be understood that the present disclosure is illustrative of various specific embodiments by which the invention is reduced to practice, but any desired variations may be made in the structural and assembly details as fall within the scope of the invention as claimed.

In the accompanying drawings, wherein like characters of reference designate like parts throughout the several views—

Figure 1 is an axial section of an anti-friction bearing as mounted on a shaft in accordance with the invention.

Figure 2 is an end view thereof, seen from the right of Figure 1.

Figure 3 is an elevation, from the bottom of Figure 1, with the bearing races in section.

Figure 4 is a section on the line 4—4 of Figure 1.

Figure 5 is a perspective view of an adapter sleeve.

Figure 6 is an axial section through an element of the mount shown in Figure 1, with shaft and adapter removed.

Figure 7 is a section on the line 7—7 of Figure 6.

Figures 8–14 are, respectively, axial sections similar to Figure 1, but illustrating various alternative forms of the assembly.

Figure 15 is a top plan view, partly in section, of the assembly shown in Figure 14.

Figures 16 and 17 are axial sectional views of further alternative forms of the invention.

Figure 18 is an axial section through part B of Figure 17.

Figures 19 and 20 are axial sectional views of a still further alternative embodiment of the invention.

Figure 21 is an end view from the right of Figure 19.

Figure 22 is an axial section through still another alternative embodiment.

Figure 23 is a section on the line 23—23 of Figure 22.

Figures 24, 26, 28, 30, 32 and 34 are, respectively, fragmentary axial sections through various other embodiments of the invention, the adapters being in elevation.

Figures 25, 27, 29, 31, 33 and 35 are sectional views taken on their respective section lines of Figures 24, 26, 38, 40, 32 and 34.

Figures 36–40 are, respectively, elevational views, partly in section, illustrating various alternative embodiments of shoes employed in connection with the adapters.

Figures 36a–40a are end views of the shoes illustrated in Figures 36 to 40, respectively.

In Figures 1, 3, 9, 12, 13, 17 and 19 the parts are shown as in extreme open or fully unlocked position. In Figures 8, 10, 14, 16 and 22 they are shown as in locked position.

The improved mount of this invention, in all embodiments, includes an arbor, such as an axle, spindle, shaft or the like, designated as S, and an encompassing machine part B which are to be firmly secured on and to the arbor. For purposes of description the arbor is shown as a shaft, while the machine part is shown as the inner race portion of an anti-friction bearing of the ball type. The part B may be a pulley, gear, wheel, coupling, etc.

In the embodiment of the invention illustrated in Figures 1 to 7 the machine part B comprises an anti-friction bearing in which the balls 50 are disposed between an outer race 51 and an inner race 52. The inner race is formed with an integral axial hub extension 53 having a taper bore adapted to engage over and upon a tubular split adapter sleeve 54 whose outside surface is of complemental taper. The bore of the adapter conforms to the peripheral surface of the shaft S, over and upon which it is slidable and rotatable when being installed or dismounted. The adapter 54 may be oversize or undersize with respect to the shaft. If oversize it, of course, slides freely on the shaft; if undersize it must necessarily be somewhat expanded to take over the shaft and in consequence binds frictionally thereon with an annular clamping constriction due to the inherent resiliency of the metal from which the sleeve is formed.

The hub portion 53 of the bearing is provided with an internal annular groove 55 opening to the bore and having parallel side walls 56 and 57. The center line of the groove substantially occupies a true plane at every point over the entire length of the groove and that plane is inclined relative to the axis of the bore, and consequently the axis of the shaft, as the axes coincide. The side walls, however, are at all points disposed radially at substantially a 90 degree angle with respect to the axis. These side walls provide shoulders between which is slidably engaged a shoe 58 in the form of a cylindrical stud carried by the adapter 54 and secured thereto in a manner to insure that the adapter and shoe shall move as a unit.

The adapter is of greater axial extent than the bearing hub 53 so that at its outer end it projects beyond the adjacent end of the hub and is provided with a wrench socket 59. The adjacent end of the bearing hub is also formed with a wrench socket 60. Any desired number of such sockets may be provided. The longitudinal slot 61 existing in the adapter by virtue of its split form is bridged by a transversely disposed insert 62 of steel or other suitable material retained in oppositely disposed housing sockets 63 which open at right angles into the slot 61, so that, as shown in Figure 3, when the insert 62 is in position in the adapter it is bisected by the center line of the slot. This insert 62 is rectangular in plan and provides a key which locks the side walls of the slot 61 against relative longitudinal shifting. Additionally it provides a dam which seals the slot against the escape of lubricant or the entry of foreign matter and when used only as a dam it may be made of cork.

The inner face of the hub portion 53 is grooved axially inwardly from its outer end at a depth corresponding to the depth of the annular groove 55 to provide a removal slot 64 which communicates at its inner end with the groove 55 and accommodates the shoe 58.

In mounting the bearing, assuming the application of the assembly as applied over the shaft from the right hand with respect to Figure 1, the adapter sleeve 54 with its shoe 58 is engaged with the part B by inserting the adapter within the hub portion 53 with the shoe 58 riding in the slot 64, and the parts are moved axially together until the shoe enters fully into the groove 55 and bears against the wall 56. It should here be noted that the slot 64 communicates with the groove 55 at its farthest point axially outward from the bearing race, at which point the split adapter sleeve has its maximum expansion.

The unit of the part B and the adapter is then applied axially over the shaft S and moved thereon to the desired location. If the adapter be oversize with respect to the shaft, wrenches are applied at the sockets 59 and 60 and the adapter is rotated in the direction in which the shaft is to rotate in service, while the hub 53 is oppositely rotated, or the adapter is held stationary while the hub 53 is rotated in a direction opposite to that in which the shaft is to rotate in service.

Immediately upon the occurrence of such rotation of the parts, the shoe 58 slides between and against the shoulders formed by the side walls 56 and 57 of the groove 55, and as these shoulders are inclined with respect to the shaft axis a camming action ensues by virtue of which the hub portion 53 and the adapter 54 are drawn axially together. This relative axial movement between the complemental tapered portions progressively contracts the adapter 54 in an increasingly firm tight frictional binding engagement on and over the shaft until the constricting pressure of the adapter is sufficient to lock the unit in its set position upon the shaft. No additional means such as lock washers, end plates, cap screws or the like is required to effect the attachment.

If the adapter bore is undersize with respect to the shaft it is, of course, self-holding on the shaft and when the unit has been positioned it is only necessary to rotate the hub 53 in a direction opposite to that in which the shaft is to rotate in service, in order to effect the attachment.

For purposes of description it will be assumed that in service the shaft is to rotate clockwise, as indicated by the arrow in Figure 2. It will be apparent that with the bearing firmly secured on the shaft, the adapter 54 and the hub 53 carrying the inner ball race 52 both rotate with the shaft and in the same direction. However, each ball 50 revolves backward around its individual axis which parallels the shaft axis, that is, in a direction opposite to that in which the shaft, adapter and inner race rotate. Accordingly, the complete ball assembly, considered as one body, does not describe as many R. P. M. as does the shaft and the adapter. In effect the balls lag behind the shaft and exert a tractive force on the inner race 52 tangentially applied in a direction opposite to that in which the shaft is rotating, and by virtue of this force the inner race, although actually revolving with the shaft, creeps backwards at the same time.

This backward creeping of the inner race 52 and also the integral hub 53 tends constantly to urge the hub 53 in the same direction in which it is initially rotated when effecting the initial attachment on the shaft. The shoe 58 is accordingly constantly cammed by the groove wall shoulder 57 with a bias to relative tightening movement between the hub and adapter, so that all during service rotation of the shaft the bearing mount is automatically and constantly maintained tightly secured on and to the shaft.

Figure 1 illustrates the extreme unlocked position of the parts, when the adapter is at its maximum expansion. The extreme locked position would be reached when the adapter shoe 58 occupied a diametrically opposite point with respect to its Figure 1 position. It is not, however, practical to permit the parts to assume the extreme locked position because of danger that the backward rotative creeping of the hub 53 might cause the shoe 58 to slide over the apex portion of the groove 55 and enter the left half thereof from the bottom, with respect to Figure 2, and automatically unlock the assembly. To avoid this contingency the inclined shoulders comprising the walls 56 and 57 are inclined at precalculated angles, so that the shoe 58, at most, slides a circumferential distance of approximately 135 degrees from extreme open to three-fourths closed positions in order to securely lock the bearing to the shaft. With a taper of bore in part B of one in twelve and with an inclination of path of shoulder to the extent of one eighth inch over a circumferential distance of 180 degrees the adapter would be caused to move into the taper bore of the part B a distance of .09375 inch if the shoe 58 moved along a circumferential distance of 135 degrees. This would cause the bore of the adapter 54 to contract one-twelfth of that value, or .0078 inch, which is actually more than is required. Of course, this inclination of path of shoulder can be increased if desired, especially where the outside diameter of the shaft exceeds one inch.

An important feature of the invention resides in the fact that the mounting is automatically self locking in either direction of rotation of the shaft. For example, if the direction of rotation of the shaft should be reversed, so that it would rotate counter clockwise with respect to Figure 2, the shoe 58 would move quickly to fully unlocked position moving the adapter outwardly of the bore and would slide as quickly into the left half portion of the groove 55 moving inwardly of the bore, whereupon the self-locking camming action would immediately follow and the mount would again be securely locked upon the shaft.

It is also an important feature of the invention that no manual locking of the mount is required. With an undersize adapter it is automatically self holding in any position in which it is placed over the shaft, so that immediately following installation the shaft may be service rotated with consequent automatic locking of the mount as previously described. It is thus possible for the mount to be installed by anyone, whether experienced or not, and the need of a mechanic is eliminated.

Figure 8 illustrates an alternative embodiment in which the continuous taper bore of the part B and adapter 54 is reversed with respect to the embodiment previously described. In this form of the invention no removal slot is provided and the adapter 54, shoe 58 and part B comprises an attached unit.

Figure 9 illustrates an alternative embodiment in which both the bore of the part B and the adapter 54 are part cylindrical and part tapered, it being in other respects similar to the form of Figure 8.

The alternative embodiment disclosed in Figure 10 is identical with the embodiment of Figure 8 except that the adapter 54 and the bore of the part B are cylindrical throughout the hub portion 53 and tapered in the zone of the inner race 52.

Figure 11 illustrates another form of the invention in which the part B is applied directly over the shaft S, both being of complemental taper, with the groove 55 communicating with a removal slot 64 as in Figure 1. In this embodiment the shoe 58 is retained in position by means of an integral lateral reduced lug 58' seated in an axially disposed socket in the shaft S and underlying the part B.

Figure 12 is illustrative of still another embodiment of the invention, in which the bore of part B and the adapter 54 are each part cylindrical and part tapered, and wherein the annular groove of the previously described embodiments is replaced by an inclined shoulder 56' formed by the outer end of the hub portion 53, which shoulder is reversely inclined with respect to the inclination of the shoulder 56 in the previously described embodiments but at the same angle with respect to the shaft axis. In this form of the invention the shoe 58 is provided with an integral holding lug 58' as in the case of Figure 11. The shoe, however, is in this instance carried in the outer projecting end portion of the adapter and cams against the shoulder 56' with its lug 58' underlying the end of the hub portion 53.

Figure 13 illustrates a further alternative embodiment in which, similar to Figure 12, the outer end of the hub portion 53 of the part B provides the inclined shoulder 56' against which the shoe 58 rides. The shoe is carried in the adapter 54 and operates between the shoulder 56' and a second and parallel shoulder 57' formed internally in a sleeve 53a which is engaged over the outer end of the hub portion 53, the two shoulders cooperating to replace the annular groove 55 of the first described embodiments.

Figures 14 and 15 illustrate still another alternative embodiment wherein the adapter 54 carries two shoes 58 which ride against the inclined shoulders 56' and 57' formed by the opposite ends of the part B. The shoes have integral lateral holding lugs 58' which ride under the overlying ends of the part B.

Figure 16 illustrates a further alternative embodiment in which the adapter 54 extends axially beyond opposite ends of the part B, which ends are inclined to provide the oppositely inclined shoulders 56' and 57'. In this instance the slot 61 of the adapter extends only part way of its length. At each projecting end the adapter carries a shoe 58 which rides against the adjacent inclined shoulder and is held in place by an integral lateral holding lug 58' which underlies the adjacent end of the part B. The shoes, in this form of the invention, are diametrically and diagonally opposed.

Figures 17 and 18 show another form of the invention wherein the hub portion 53 of the part B, instead of having the groove 55 of the first described forms, is provided with a cutout 55' extending over an arc of less than 360 degrees and having parallel side walls which provide the inclined shoulders 56'' and 57'' between which the shoe 58 rides. The shoe is carried in the adapter 54 as in the previously described forms.

Figures 19, 20 and 21 illustrate yet another alternative form of the invention in which the shoe 58 is carried in the part B and extends radially into its bore to ride against the oppositely inclined shoulders 156 and 157 formed at the outer end of the adapter 54. The shoulders converge axially inwardly of the adapter at a point diametrically opposite its longitudinal slot 61 and their total extent is around a circumference of less than 360 degrees. At its outer end the adapter is formed with integral axially disposed extensions 54a along each side of the slot 61. These extensions project beyond the adjacent end of the hub 53 of the part B and are notched as at 59a to provide toe holds for a tool by which the adapter may be levered axially from the bore. The notches have side walls 54b which provide toe holds for a wrench.

Figures 22 and 23 disclose another structural embodiment in which the adapter 54 is provided with a cutout 55a around an arc of less than 360 degrees similar to the cutout 55' provided in the part B in Figures 17 and 18 but oppositely inclined with respect to the axis of shaft S. This cutout provides the parallel inclined shoulders 56a and 57a between which the shoe 58 rides. In this form of the invention the shoe has a reduced portion 58a received in a socket provided therefor in the hub portion 53 of the part B.

Figures 24 and 25 disclose another embodiment utilizing the part B provided, as in Figure 1, with the annular groove 55 and with substantially the same tubular split adapter 54. In this form, however, the shoe 58b is of oval form in plan with its major axis disposed circumferentially of the adapter in which it is loosely housed in rectangular sockets 65 and 66 disposed in transverse alignment at opposite sides of and opening to the slot 61. The shoe bridges the slot 61 by which the adapter is split and the center line of the slot bisects the shoe. The oval formation of the shoe provides oppositely curved side faces which ride against the inclined groove shoulders 56 and 57 with a maximum bearing contact. The depth of the sockets 65 and 66 is such that their bottoms, as shown in Figure 25, occupy a common plane which forms a chord with respect to the shaft S. Thus, when the mount is removed from the shaft the ends of the shoe will seat on the socket bottoms and the shoe will be prevented from falling into the bore of the adapter beyond a point which permits it to clear the groove 55. The oval form of the shoe also permits of its limited rotation on an axis which is radially perpendicular to the axis of the shaft. At its base the shoe is rectangular to conform with the sockets 65 and 66, only that part of the shoe which rides between the shoulders 56 and 57 is made oval.

Figures 26 and 27 illustrate a further embodiment in which the structure is identical with that of Figure 24 except that the depth of the recesses or sockets 65 and 66 is less. In order to permit removal or insertion of the adapter with respect to the bore of the part B, the inner face of the part B along each side of the slot 61 outwardly from the sockets 65 and 66 is grooved as at 64' to the depth of the groove 55 to provide a removal slot similar in function to the slot 64 of Figure 1. Also, in this instance, the shoe 58c is sufficiently reduced to be accommodated within the removal slot.

Figures 28 and 29 show a still further alternative embodiment wherein the adapter 54 is itself provided with an internal annular groove loosely seating a split ring 67 provided with radially directed end extensions 58d and 58e which together comprise the shoe. These shoe extensions project through an aperture 68 located in the adapter at a point diametrically opposed to the slot 61 and ride in the groove 55 in part B against the inclined shoulders comprising its side walls. The side faces of the shoe extensions 58d and 58e are curved for proper bearing contact against the inclined shoulders of the groove. In this embodiment the part B is provided with the removal slot 64, as in Figure 1.

At a time when the part B and adapter 54 are in the process of being secured to the shaft S the part B is rotated in a direction opposite to that in which the shaft is to rotate in service. When this takes place the resultant camming action of the inclined groove shoulder against the advanced end 58d or 58e, depending upon the direction of rotation, will cause the ring 67 to shift circumferentially and as the end wall of the aperture 68 in the adapter arrests movement of the other end the result will be that the ring is constricted into firm clamping engagement upon the shaft. This in turn prevents any rotative shifting of the adapter and obviates the necessity for manually holding the adapter with a wrench while the part B is being rotated. The same action occurs in the automatic locking of the parts, in which case the rotation of the shaft will not only cause the ring 67 to clamp itself around the shaft but will also perform the complete operation of firmly securing, that is, locking, the part B and the adapter to the shaft.

Figures 30 and 31 are illustrative of another form which the invention may take. In this instance the structure is practically identical with that of Figures 24 and 25 except that the socket recesses 65' and 66' as well as the shoe 58f are somewhat longer and the bottoms of the sockets are curved oppositely and eccentrically with respect to the radius of the adapter 54, providing substantially wedge shaped portions 65a and 65b respectively. In either the manual or automatic locking of the mount, when the part B is rotated, the camming action of its inclined groove shoulders against the curved side of the shoe 58f will cause the shoe to shift circumferentially and ride over the particular wedge shaped portion 65a or 65b that is advanced, having reference to the direction of rotation. Thus the shoe wedges the engaged portion of the adapter firmly against the shaft S, as shown by its dotted line position in Figure 31, and holds the adapter against rotation with respect to the shaft, obviating the need of a wrench to hold it and also enabling the performance of a complete automatic locking operation in securing the mount to the shaft. In this embodiment, as also in the case of the form of Figures 24 and 26, the shoe bridges the adapter slot 61 and prevents longitudinal relative shifting of the recesses housing the shoe as well as serving as a seal against the leakage of lubricant and the entry of foreign matter.

The embodiment illustrated in Figures 32 and 33 is identical with that of Figure 1 except that in this instance the shoe 58 is retained loosely in a cylindrical socket 69 in the adapter 54.

Figures 34 and 35 illustrate still another structural modification of the invention wherein the adapter 54 is made adjustable with respect to its degree of contraction. It is identical with the embodiment illustrated in Figures 32 and 33 except that in this instance the adapter is provided with two sockets 69a and 69b in either of which the shoe may be selectively positioned. The socket 69a is disposed substantially at the midsection of the adapter while the socket 69b is closer to its outer end. When the shoe is disposed in the innermost socket 69a the bore of the adapter is permitted to expand to a greater extent radially, whereas with the shoe located in the outer socket 69b the adapter is caused to constrict radially to a greater degree than if located in the inner socket. This construction permits a range of adjustability to accommodate installations where the shaft S has an outside diameter exceeding maximum standard tolerance or which is below standard minimum tolerances.

The shoe 58, when carried by the part B, as in Figures 19 and 21, is rigidly secured therein by threading or press fitting. It may, if desired, be correspondingly secured to the adapter in the other embodiments but it is preferred that it be not permanently connected to the adapter. In all instances where the shoe is carried in the adapter it is confined radially between the peripheral surface of the shaft and the bottom of the groove in part B, or retained by means of the holding lugs as described, so that it cannot be dislocated by the action of centrifugal force.

Figure 36 illustrates the specific shoe 58 employed in the structure of Figures 1, 8, 9, 10, 13, 17, and 32, wherein it is of cylindrical form with its end bearing on the shaft S curved to conform thereto and its opposite or outer end curved in parallel to conform to the bottom of the groove 55 in which it rides. This type of shoe cannot twist or rotate on its axis. The same shoe is shown in Figure 38, except that its shaft engaging end is squared while its outer end is spherical, thus permitting the shoe to rotate on its axis.

Figure 37 illustrates a modified form of shoe 58g in which the shaft engaging end is curved to conform thereto, which prevents the shoe from turning on its longitudinal axis. Its outer end portion which rides against the inclined shoulder as previously described is formed with curved side faces 70 and 71 so that the shoe is self-accommodating to changes in angularity of the path of the shoulder against which it slides. The structure of Figure 39 is similar to that of Figure 37 except that the shaft bearing end of the shoe is squared, permitting the shoe to rotate on its axis, and the sides 70' and 71' are parallel.

Figure 40 illustrates a further modified form of shoe 58 in which the shaft engaging end is squared to permit rotation of the shoe on its axis in the adapter and wherein the outer end is formed with flat convergent side faces 72 and 73.

In all embodiments of the invention the angularity of the inclined shoulder or shoulders against which the particular shoe engages may be varied as to degree and direction. In those instances in which the adapter is employed, the adapter, broadly considered, becomes in effect a part of the arbor S when affixed thereon. The invention is applicable to installations in which the arbor S constitutes a non-rotatable support around which the machine part associated with the outer bearing race revolves, as well as to installations in which the outer bearing race is a fixed support and in which the arbor rotates with its attached inner bearing race. The principle remains the same in both. Also, in all embodiments of the invention, the inclined shoulder against which the shoe rides is disposed in a path that is inclined or diagonal with respect to a radial plane disposed at 90 degrees to the axis of the arbor or bore of the part on which the shoulder is disposed, it being optional, however, whether the shoulder at any point along its length should lie in a true radial plane at 90 degrees with respect to such axis.

I claim:

1. In combination, an arbor, a machine part encompassing same to be secured thereto, a split tubular sleeve slidably and rotatably engageable over said arbor between it and said part, said sleeve and part being relatively rotatable and axially movable and having complemental portions tapered on the axis of the arbor, cooperable means on said sleeve and part and operable upon rotation of either to force said complemental tapered portions into engagement contracting and clamping said sleeve on the arbor while at the same time coupling the sleeve and part for rotation in unison, and said means being biased by rotary movement of either said part or sleeve to exert its force continuously during such rotation.

2. An instantly reversible mount, irrespective of direction of shaft rotation, comprising a shaft, a machine part encompassing same to be secured thereto, said part and shaft having complemental portions tapered on the axis of the shaft and being relatively rotatable and relatively movable axially, means on one engageable with the other to force said tapered portions into engagement upon rotation of either in either direction, and said means being biased by rotary movement of either to exert its force continuously during such rotation.

3. A self-securing bearing mount comprising in combination, a shaft, a tubular member slidable and rotatable thereon and adapted to be radially contracted and expanded relative thereto, a bearing member slidable and rotatable on said tubular member, said members having complemental portions tapered on the axis of the shaft, cam means on one member, and means carried by the other member and slidably engaging said cam means on rotation in either direction of either member to engage said tapered portions and contract the tubular member on the shaft and also firmly secure said bearing member onto said tubular member.

4. A self-securing bearing mount comprising in combination, a shaft, a longitudinally split adapter sleeve disposed thereon, a bearing member slidably and rotatably disposed over said sleeve, said member and sleeve having complemental portions tapered on the axis of the shaft, cooperable means on said sleeve and member and operable upon rotation of either to force said tapered portions together, the opposed edges of said split sleeve being provided with transversely aligned sockets, and a bridge member seated in said sockets and extending across and sealing the sleeve slot, said bridge member serving also to anchor the opposed side edges of the split sleeve against relative longitudinal shifting.

5. A self-securing bearing mount comprising in combination, a shaft, a longitudinally slotted adapter sleeve disposed thereon, a bearing member slidably and rotatably disposed over said sleeve, said member and sleeve having complemental portions tapered on the axis of the shaft, a guide groove in said bearing member, a shoe carried by said sleeve and bridging the slot therein, said shoe being engaged in said guide groove and operable by relative rotary movement between said member and sleeve to force said tapered portions together in connected engagement.

6. A self-securing bearing mount comprising in combination, an arbor, a bearing member encompassing same to be secured thereto, an adapter sleeve interposed between said arbor and bearing member, said sleeve and bearing member being relatively rotatable and relatively movable axially and having complemental portions tapered on the axis of the arbor, a camming surface on the bearing member all points of which substantially reside in a true plane, and means carried by the adapter sleeve and cooperating with said camming surface upon relative rotative movement between said bearing member and adapter sleeve to effect an axial shift therebetween forcing said tapered portions into binding engagement to firmly secure the bearing member with adapter sleeve to the arbor.

7. A self-securing bearing mount comprising a shaft member, a bearing member rotatable thereon and slidable axially thereof, said members having complemental portions tapered on the shaft axis, a circumferentially extending guide on one of said members comprising a pair of cam surfaces extending in opposite directions from a point of juncture which is the low point of the cam surfaces, said cam surfaces having paths inclined at angles with respect to the shaft axis, an abutment carried by the other member and slidably engaging said guide, and said abutment being movable along the guide by relative rotary movement in either direction between the members whereby to effect an axial shift therebetween urging said tapered portions into binding engagement to firmly secure the bearing member to the shaft.

8. A self-securing bearing mount comprising a shaft member, a bearing member rotatable thereon and slidable axially thereof, said members having complemental portions tapered on the shaft axis, a circumferentially extending guide on one of said members comprising a pair of cam surfaces extending in opposite directions from a point of juncture which is the low point of the cam surfaces, said cam surfaces having paths all points of which substantially lie in a single plane inclined at an angle with respect to the shaft axis, an abutment carried by the other member and slidably engaging said guide, and said abutment being movable along the guide by relative rotary movement in either direction between the members whereby to effect an axial shift therebetween urging said tapered portions into binding engagement to firmly secure the bearing member to the shaft.

9. A self-securing bearing mount comprising a shaft member, a bearing member rotatable thereon and slidable axially thereof, said members having complemental portions tapered on the shaft axis, a circumferentially extending guide on one of said members comprising a pair of cam surfaces extending in opposite directions from a point of juncture which is the low point of the cam surfaces, said cam surfaces having paths inclined at angles with respect to the shaft axis, there being an entrance groove in the guide provided member disposed in alignment with said low point or cam juncture, an abutment carried by the other member and movable through said entrance groove into engagement with said guide, and said abutment being movable along the guide by relative rotary movement in either direction between the members whereby to effect an axial shift therebetween urging said tapered portions into binding engagement to firmly secure the bearing member to the shaft.

10. A self-securing bearing mount comprising in combination, an arbor, a bearing member encompassing same to be secured thereto, an adapter sleeve interposed between said arbor and bearing member, said sleeve and bearing member being relatively rotatable and relatively movable axially and having complemental portions tapered on the axis of the arbor, said bearing member having a cam groove all points of which substantially reside in a true plane and an entrance groove communicating with said cam groove, and an abutment carried by the adapter sleeve and movable through the entrance groove into the said cam groove, said abutment being movable along the cam groove by relative rotary movement between said bearing member and adapter sleeve to effect an axial shift therebetween forcing said tapered portions into binding engagement to firmly secure the bearing member with adapter sleeve to the arbor.

11. A self-securing bearing mount comprising in combination, an arbor, a bearing member encompassing same to be secured thereto, an adapter sleeve interposed between said arbor and bearing member, said sleeve and bearing member being relatively rotatable and relatively movable axially and having complemental portions tapered on the axis of the arbor, said bearing member having a cam groove all points of which substantially reside in a true plane and an entrance groove communicating with said cam groove, an abutment carried by the adapter sleeve and movable through the entrance groove into the said cam groove, said abutment being movable along the cam groove by relative rotary movement between said bearing member and adapter sleeve to effect an axial shift therebetween forcing said tapered portions into binding engagement to firmly secure the bearing member with adapter sleeve to the arbor, said adapter sleeve being longitudinally split, the opposed edges of said split sleeve being provided with transversely aligned sockets, and a bridge member seated in said sockets and extending across and sealing the sleeve slot, said bridge member serving also to anchor the opposed side edges of the split sleeve against relative longitudinal shifting.

12. A self-securing bearing mount, comprising in combination, an arbor, a bearing member encompassing same to be secured thereto, an adapter sleeve interposed between said arbor and bearing member, said sleeve and bearing member being relatively rotatable and relatively movable axially and having complemental portions tapered on the axis of the arbor, said bearing member having an internal cam groove, said adapter sleeve being provided with an internal circumferentially extending groove and a slot extending completely through the sleeve and communicating with said groove therein, a split ring disposed in the sleeve groove and having radial projections at its ends extending through said sleeve slot and into the cam groove in the bearing member, said projections being movable along said cam groove by relative rotary movement between said bearing member and adapter sleeve to effect an axial shift therebetween forcing said tapered portions into binding engagement to firmly secure the bearing member with adapter sleeve to the arbor.

13. A self-securing bearing mount comprising in combination, an arbor, a bearing member encompassing same to be secured thereto, a longitudinally split adapter sleeve interposed between said arbor and bearing member adapted to be radially contracted upon the arbor, said sleeve and bearing member being relatively rotatable and relatively movable axially and having complemental portions tapered on the axis of the arbor, a camming surface on the bearing member all points of which substantially reside in a true plane, and an abutment carried by the adapter sleeve and cooperating with said camming surface upon relative rotative movement between said bearing member and adapter sleeve to effect an axial shift therebetween forcing said tapered portions into binding engagement to firmly secure the bearing member with adapter sleeve to the arbor, said abutment being adjustable longitudinally of the sleeve to vary the range of radial contraction of the sleeve.

14. A self-securing bearing mount comprising in combination, an arbor, a bearing member encompassing same to be secured thereto, a contractable adapter member interposed between said arbor and bearing member, said adapter and bearing members being relatively rotatable and relatively movable axially and having complemental portions tapered on the axis of the arbor, a camming surface on an end of one of said members all points of which substantially reside in a true plane, and an abutment carried by the other member and cooperating with said camming surface upon relative rotative movement between said bearing member and adapter sleeve to effect an axial shift therebetween forcing said tapered portions into binding engagement to firmly secure the bearing member with adapter sleeve to the arbor.

NILS MILLER.